US012732476B2

(12) United States Patent
Guo et al.

(10) Patent No.: US 12,732,476 B2
(45) Date of Patent: Sep. 8, 2026

(54) CONNECTOR FOR CONNECTING A DEVICE AND A COMMUNICATION LINE AND CONNECTOR SYSTEM

(71) Applicant: Schneider Electric (China) Co., Ltd., Beijing (CN)

(72) Inventors: Yuchun Guo, Shanghai (CN); Ying Shi, Shanghai (CN); Baoyun Bi, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 218 days.

(21) Appl. No.: 18/522,126

(22) Filed: Nov. 28, 2023

(65) Prior Publication Data

US 2025/0112890 A1 Apr. 3, 2025

(30) Foreign Application Priority Data

Sep. 28, 2023 (CN) ........................ 202322666912.X

(51) Int. Cl.

*H04L 61/5038* (2022.01)
*H01R 9/24* (2006.01)
*H01R 13/10* (2006.01)
*H04L 101/627* (2022.01)

(52) U.S. Cl.

CPC ....... *H04L 61/5038* (2022.05); *H01R 9/2425* (2013.01); *H01R 13/10* (2013.01); *H04L 2101/627* (2022.05)

(58) Field of Classification Search

CPC ... H01R 9/2425; H01R 13/10; H04L 61/5038; H04L 2101/627
USPC .................................................... 439/710, 79
See application file for complete search history.

(56) References Cited

U.S. PATENT DOCUMENTS 7,273,391 B2 * 9/2007 Purwin ................ H01R 12/722 439/502
7,384,276 B2 * 6/2008 Lee ....................... G06F 13/409 439/79
7,540,747 B2 * 6/2009 Ice ...................... H01R 13/6608 439/620.09
8,239,602 B2 * 8/2012 Gutekunst ........... H04L 61/5038 710/305

(Continued)

FOREIGN PATENT DOCUMENTS

EP 1445675 A2 8/2004
EP 2757383 A1 7/2014

OTHER PUBLICATIONS

European Search Report and Search Opinion dated May 22, 2024 for corresponding European Patent Application No. EP 23211963.6, 8 pages.

*Primary Examiner* — Gary F Paumen
(74) *Attorney, Agent, or Firm* — Patterson + Sheridan, LLP

(57) ABSTRACT

A connector for connecting a device and a communication line is disclosed. The connector includes a first interface unit and an address storage unit. The first interface unit includes a plurality of connection ends. An address information is stored in the address storage unit. A first group of the connection ends is connected to the communication line. A second group of the connection ends is connected to the address storage unit. A third group is connected to the device. The address of the device can be determined by the address information. A connector system for connecting devices and communication lines and to a motor control center is also disclosed.

10 Claims, 3 Drawing Sheets

(56) References Cited

U.S. PATENT DOCUMENTS

| | | | | |
|---|---|---|---|---|
| 8,282,403 | B2 * | 10/2012 | Sawai | H01R 12/714 439/79 |
| 8,348,680 | B2 * | 1/2013 | Mcclellan | H05K 1/141 439/79 |
| 8,573,988 | B2 * | 11/2013 | Fujikawa | H01R 12/722 439/79 |
| 2007/0224854 | A1 * | 9/2007 | Bacha | H05K 1/144 439/79 |
| 2010/0146182 | A1 | 6/2010 | Gutekunst et al. | |

* cited by examiner

CONNECTOR FOR CONNECTING A DEVICE AND A COMMUNICATION LINE AND CONNECTOR SYSTEM

CROSS-REFERENCE TO RELATED APPLICATIONS

This application claims the benefit of priority to and incorporates herein by reference Chinese Utility Model Application No. 202322666912. X filed on Sep. 28, 2023.

TECHNICAL FIELD

The present disclosure relates to a connector for connecting a device and a communication line, a connector system for connecting devices and communication lines, and motor control centers.

BACKGROUND

In the field of industrial control, industrial manufacturing or process control, communication is required between field devices and control devices, for which communication lines are necessary. Common communication lines are RS422, Ethernet/IP, CAN, etc. The CAN (Controller Area Network) bus is nowadays used in a wide range of technical fields such as automotive manufacturing, industrial automation, medical devices, etc. In the case of using the CAN bus, signaling between several modules or devices in a system can be achieved with only two signal lines.

The connection of these modules or devices to the communication lines is realized through connectors. Conventional connectors are only used to provide connectivity and require long preparation times and poor reliability due to the complexity of the preparation process.

SUMMARY

Embodiments of the present disclosure provide a connector for connecting a device and a communication line, a connector system for connecting devices and communication lines. The connector and connector system are capable of, on the one hand, connecting the device to the communication line and, on the other hand, also capable of determining an address, i.e., a physical location, of the device to which connected to the connector.

An embodiment of the present disclosure provides a connector for connecting a device and a communication line, the connector including-a first interface unit, wherein the first interface unit includes a plurality of connection ends, an address storage unit, wherein an address information is stored in the address storage unit, wherein a first group of the connection ends is connected to the communication line, a second group of the connection ends is connected to the address storage unit, and a third group of the connection ends is connected to the device, and wherein an address of the device can be determined by the address information.

In an embodiment according to the present disclosure, the connector further includes a second interface unit and a third interface unit, wherein the second interface unit and the third interface unit are each connected to a first group of the connection ends of the first interface unit via inner connection ends of the second and third interface unit, and the second interface unit and the third interface unit are each connected to the communication line via outer connection ends of the second and third interface unit.

In an embodiment according to the present disclosure, the communication line is a CAN communication line and the first group of connection ends includes connection ends for the CAN communication line.

In an embodiment according to the present disclosure, the address storage unit is configured as an editable address storage unit.

In an embodiment according to the present disclosure, the first interface unit, the second interface unit and the third interface unit are configured as plug units.

In an embodiment according to the present disclosure, the first interface unit, the second interface unit and the third interface unit are configured as RJ45 terminals.

An embodiment of the present disclosure also provides a connector system for connecting devices and communication lines, the connector system including a plurality of connectors as described earlier; wherein the first interface unit of each connector is configured to connect to one of the plurality of devices, respectively, and wherein the second interface unit and the third interface unit of each connector are configured to connect to the second interface unit or the third interface unit of another connector, respectively, such that the plurality of the connectors is connected in series on the communication line.

In an embodiment according to the present disclosure, the connector system includes a plurality of pairs of socket units, wherein two socket units in each pair of socket units are connected to each other and the second interface unit and the third interface unit are configured as plug units, the second interface unit of the connector is connected to one socket unit in one socket unit pair, and the third interface unit of the connector is connected to one socket unit in another socket unit pair.

An embodiment of the present disclosure also provides a motor control center, the motor control center including a connector system as described earlier and a control device, wherein the control device is connected to the communication line through a connector in the connector system, respectively.

In embodiments according to the present disclosure, the control equipment includes motor control equipment, transformer equipment, lighting equipment, power distribution equipment and relay equipment.

The connector according to an embodiment of the present disclosure is capable of realizing, on the one hand, the basic function of connecting a device and a communication line and, on the other hand, having its address information, i.e., positional information, known through an additionally arranged address storage unit, so that, if a device has been successfully connected to the connector, it is possible to determine through the address information the position of the device that has been connected. In addition, the connector configured as an RJ45 terminal can simply and reliably crimp individual wire connections in the communication line into the RJ45 terminal as opposed to the DB9 connector employed in the prior art. In addition, the connector configured as an RJ45 terminal can be more reliably connected to a device based on the reverse snap connection method of the RJ45.

BRIEF DESCRIPTION OF DRAWINGS

In order to more clearly illustrate the technical solutions of the embodiments of the present disclosure, the accompanying drawings to be used in the description of the embodiments will be briefly described below. Obviously, the accompanying drawings in the following description are only some exemplary embodiments of the present disclosure, and other embodiments may be obtained from these embodiments without creative labor for those of ordinary skill in the art.

DETAILED DESCRIPTION

In order to make the objects, technical solutions and advantages of the present disclosure more apparent, example embodiments according to the present disclosure will be described in detail below with reference to the accompanying drawings. Obviously, the described embodiments are only a part of the embodiments of the present disclosure and not all of the embodiments of the present disclosure, and it should be understood that the present disclosure is not limited by the example embodiments described herein.

In this specification and the accompanying drawings, substantially the same or similar steps and elements are indicated by the same or similar drawing marks, and repetitive descriptions of these steps and elements will be omitted. Also, in the description of the present disclosure, the terms “first”, “second”, etc. are used only to differentiate the description and are not to be understood as indicating or implying relative importance or order.

Figure 1:
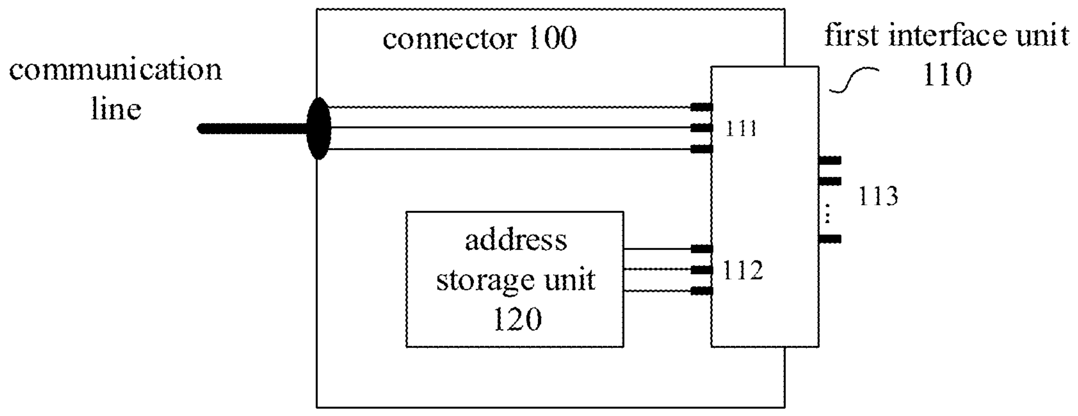
FIG. 1 illustrates a schematic block diagram of a connector for connecting a device and a communication line according to an embodiment of the present disclosure.

FIG. 1 illustrates a schematic block diagram of a connector 100 for connecting a device and a communication line according to an embodiment of the present disclosure. The connector 100 may e.g. be a header for a communication line. Through the connector, it is possible to connect devices, in particular different control devices, to the communication line.

In FIG. 1, connector 100 includes a first interface unit 110. The first interface unit 110 includes a plurality of connection ends, which may e.g. include connection ends inside the connector, such as a first group of connection ends 111 and a second group of connection ends 112 of the connection ends illustrated in FIG. 1, as well as a third group of connection ends 113 outside of the connector. The first group of connection ends 111, the second group of connection ends 112 and the third group of connection ends 113 are exemplarily shown in FIG. 1 as three connection ends. Each group of connection ends may also have any number of connection ends. Connector 100 also includes an address storage unit 120 in which address information is stored. A first group of connection ends 111 of the connection ends of the first interface unit 110 of the connector 100 is configured to connect to the communication line, and a second group of connection ends 112 is configured to connect to the address storage unit 120. In addition, a third group of connection ends 113 of the connection ends external to the first interface unit 110 is used, e.g., for connecting to an external device, in particular to an external device via an interface to the external device.

The connector according to an embodiment of the present disclosure is capable of realizing, on the one hand, the basic function of connecting a device and a communication line and, on the other hand, also having its address information, i.e., its location information, known through an additionally arranged address storage unit, so that in the event of a successful connection of a device to the connector, the location of the device that has been connected can be determined through this address information.

In an embodiment according to the present disclosure, the communication line may e.g. be a CAN communication line. Accordingly, the first group of connection ends 111 may be connection ends for a CAN communication line. In the case of communication utilizing the CAN protocol, the CAN communication line, i.e., the CAN bus, has three lines, CANL, CANH, and GND. Therefore, the first group of connection ends 111 has three connection ends for connecting to CANL, CANH, and GND, respectively. In embodiments according to the present disclosure, the communication lines may e.g. also be other forms of communication lines, and the first group of connection ends 111 has a number of connection ends suitable for the corresponding communication lines.

In embodiments according to the present disclosure, the address memory may e.g. be a read-only memory (ROM), a programmable read-only memory (PROM), an erasable programmable memory (EPROM) or an electrically erasable programmable read-only memory (EEPROM). Address information may be pre-stored in these memories. In embodiments according to the present disclosure, the address storage unit may e.g. be configured as an editable address storage unit, such as an erasable programmable memory (EPROM) or an electrically charged erasable programmable read-only memory (EEPROM). The editable address storage unit enables editing and changing of address information. For example, if a connector or a device connected to the connector is relocated, new address or location information can be rewritten in the editable address memory unit.

In an embodiment according to the present disclosure, the first interface unit 110 may e.g. be configured as an RJ45 terminal. RJ45 terminal may be referred to as an 8P8C (8 position 8 contact) connector or a crystal head.

In the prior art, DB9 connectors are configured to connect devices and communication lines. To make the connection, it is necessary to manually connect and fix each wire in the communication line to each corresponding connection end, i.e., pin. This makes the connection process very complex and inefficient, and the reliability of the connection is not guaranteed. In addition, multiple connections of individual wires and pins in the communication line may affect the signal quality of the communication. In contrast, with the RJ45 terminal, the individual wire connections in the communication line can be simply and reliably crimped to the RJ45 terminal. In addition, the RJ45 can be more reliably connected to a device based on the reverse snap connection of the RJ45.

Figure 2:
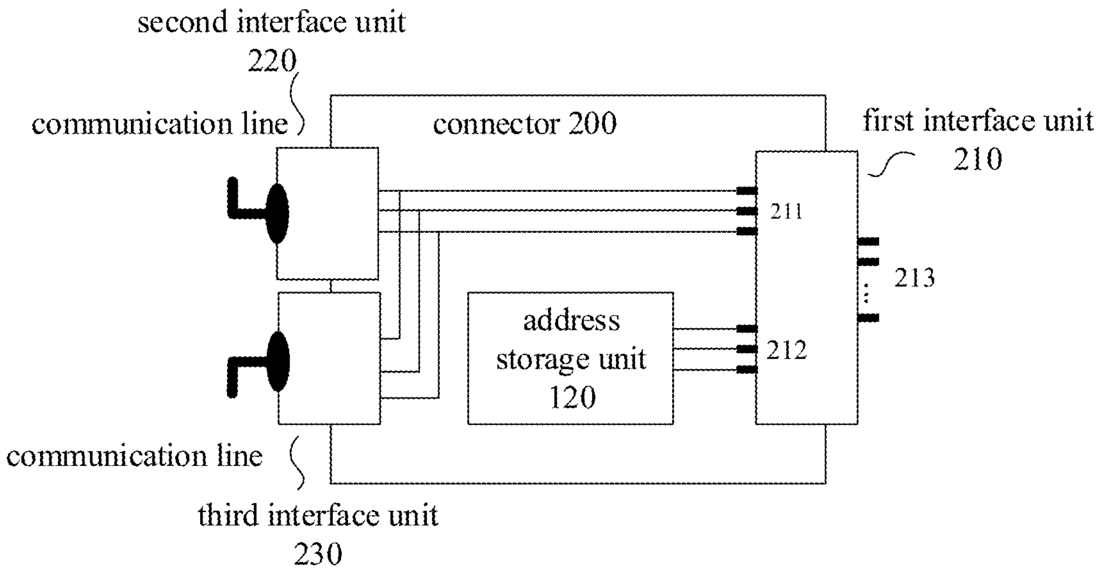
FIG. 2 illustrates a schematic block diagram of a connector for connecting a device and a communication line according to another embodiment of the present disclosure.

FIG. 2 illustrates a schematic block diagram of a connector 200 for connecting a device and a communication line according to another embodiment of the present disclosure. In FIG. 2, the address storage unit 120 remains connected to a second group of connection ends 212 of the first interface unit 210. Connector 200 in FIG. 2 is distinguished from connector 100 in FIG. 1 in that connector 200 also includes a second interface unit 220 and a third interface unit 230. Inside connector 200, the second interface unit 220 and the third interface unit 230 are connected to the first group of connection ends 211 of the first interface unit 210 via their inner connection ends, respectively. Outside connector 200, the second interface unit 220 and the third interface unit 230 are connected to a communication line via their outer connection ends 213, respectively. Such a connector according to this embodiment of the present disclosure can be realized as an independent connector in a system where a plurality of devices need to be connected, and it is not necessary to bind the connector to the communication line. Flexible arrangement and interconnection of communication lines and devices can thus be realized. In embodiments according to the present disclosure, a serial connection of a plurality of connectors 200, in particular a serial connection to a communication line, e.g. a CAN bus, can be realized through the second interface unit 220 and the third interface unit 230, and in the case of connecting a plurality of devices individually to these connectors 200, a serial connection of these devices on the communication line can be realized.

Figure 3:
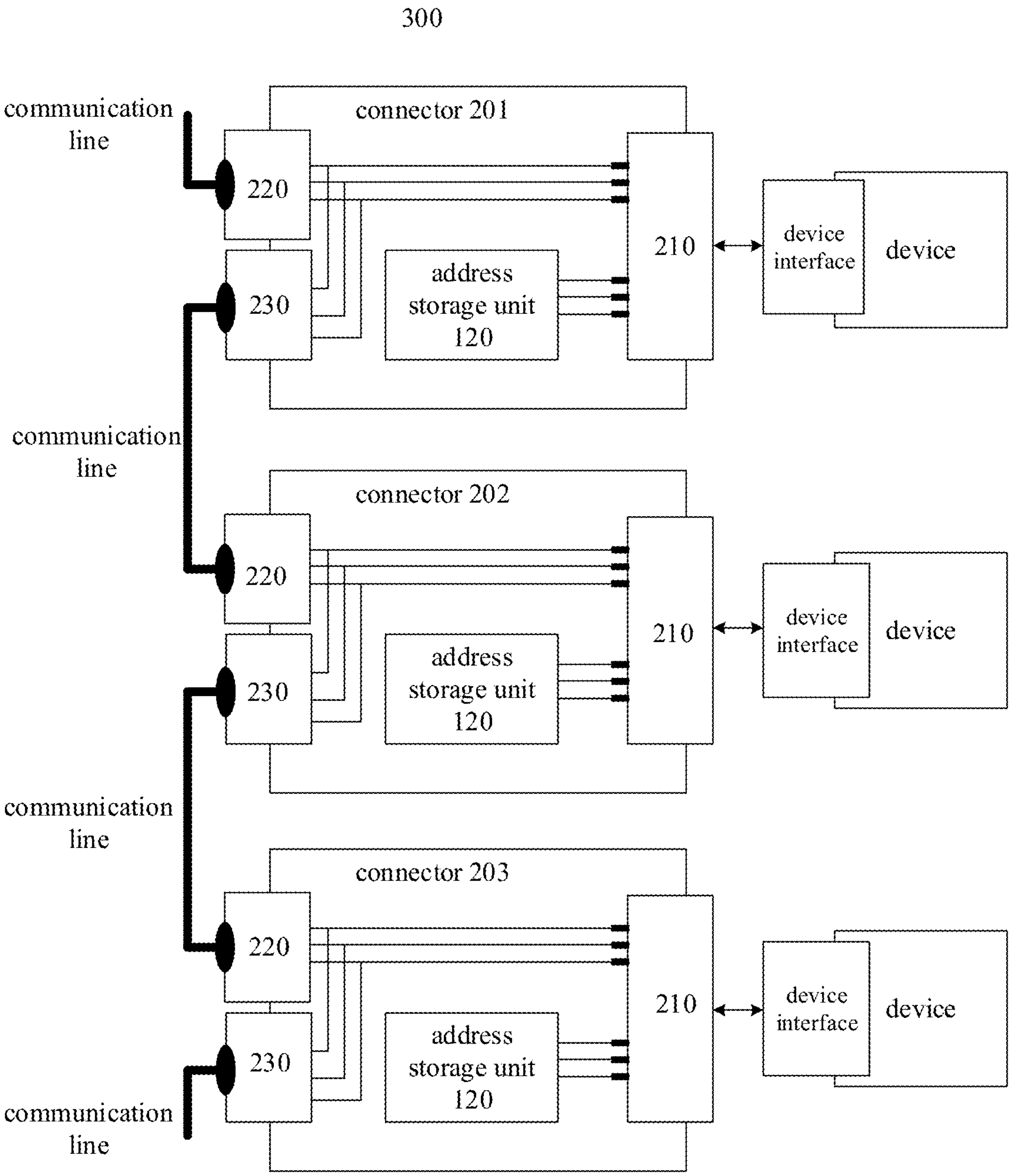
FIG. 3 illustrates a connector system for connecting devices and communication lines according to embodiments of the present disclosure.

FIG. 3 illustrates a connector system 300 for connecting device to a communication line according to an embodiment of the present disclosure. the connector system 300 may be a cabinet for arranging equipment and connecting a plurality of equipment to a communication line. The devices may be configured as drawers for placement into the cabinet. The connector system 300 shown in FIG. 3 has three connectors 201, 202 and 203, but of course more connectors can be arranged. These connectors are configured in the same way as connector 200 shown in FIG. 2. A first interface unit 210 of each connector 201, 202 and 203 is respectively used to connect to one of the plurality of devices, e.g. in particular to a device interface of a device, and a second interface unit 220 and a third interface unit 230 of each connector 201, 202 and 203 are respectively used to connect to a second interface unit 210 of another connector 201, 202 and 203 or a third interface unit 230, respectively, such that a plurality of the connectors 201, 202 and 203 are connected in series on the communication line.

Figure 4:
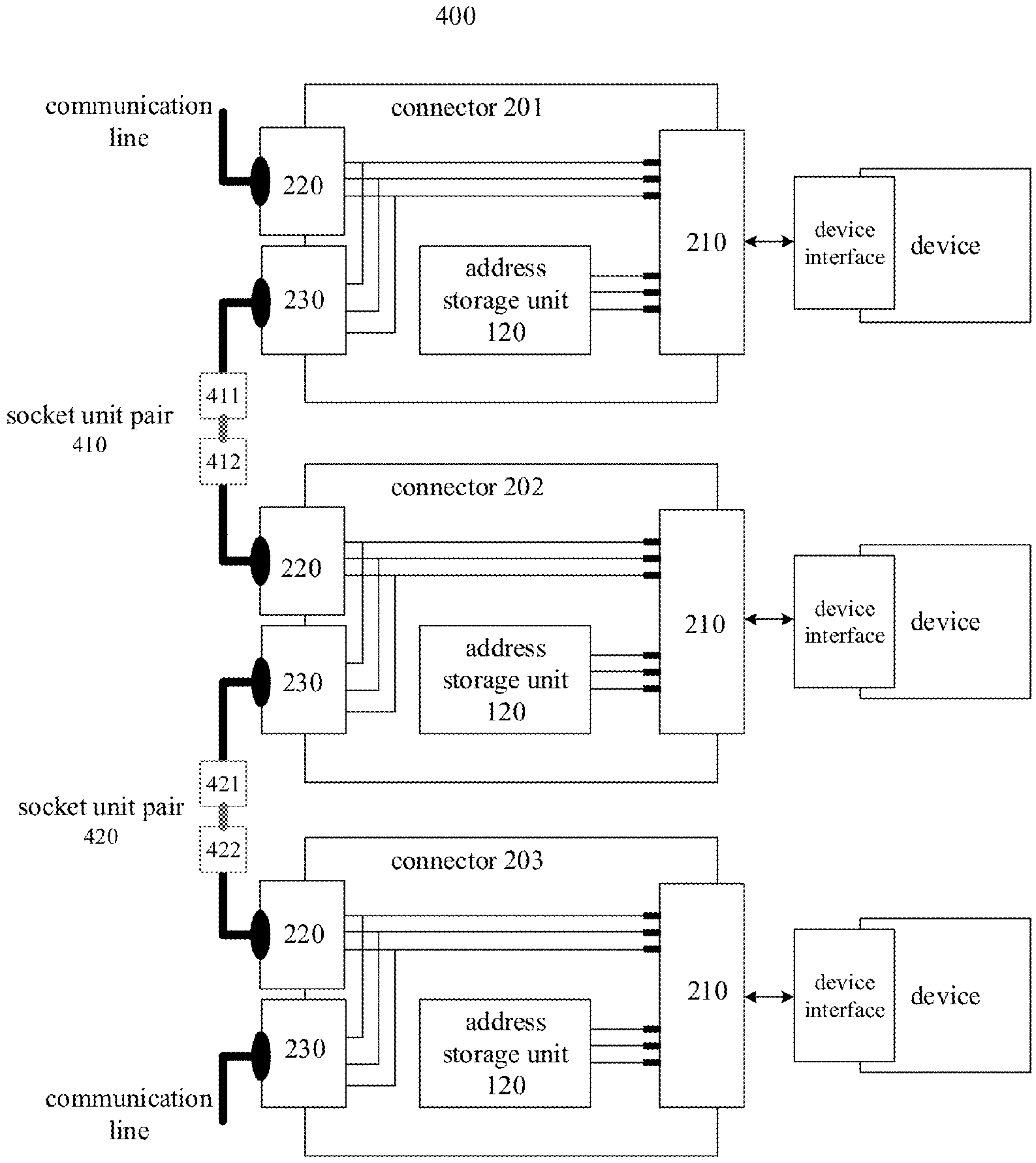
FIG. 4 illustrates a connector system for connecting devices and communication lines according to another embodiment of the present disclosure.

FIG. 4 illustrates a connector system 400 for connecting a device and a communication line according to another embodiment of the present disclosure. In an embodiment according to the present disclosure, the connector system 400 includes a plurality of socket unit pairs 410 and 420, wherein two socket units 411 and 412 of the socket unit pairs 410 are connected to each other and two socket units 421 and 422 are connected to each other, and, of course, a greater number of socket unit pairs can be arranged. The second interface unit 220 and the third interface unit 230 of the respective connectors 201, 202 and 203 are configured as plug units. The second interface unit 220 of the connectors 201, 202 and 203 is connected to one socket unit of one of the socket unit pairs 410 and 420, and the third interface unit 230 of the connectors 201, 202 and 203 is connected to a further socket unit pair 410 and 420 to one of the socket units. In FIG. 4, the third interface unit 230 of the connector 201 as a plug is connected to the socket unit 411 of the socket unit pair 410, and the second interface unit 220 of the connector 202 as a plug is connected to the socket unit 412 of the socket unit pair 410. In this manner, the connector 201 and the connector 202 are connected to each other. The third interface unit 230 of the connector 202 as a plug is connected to the socket unit 421 of the socket unit pair 420, and the second interface unit 220 of the connector 203 as a plug is connected to the socket unit 422 of the socket unit pair 420. In this manner, the connector 202 and the connector 203 are connected to each other. Eventually the serial connection of connectors 202, 203 and 204 is realized. The second interface unit 220 of the connector 201 and the third interface unit 230 of the connector 203 located at the two ends are connected to the communication line, resulting a serial connection of the connectors 202, 203 and 204 on the communication line. In the case where the individual devices are connected to the first interface unit 210 of the connectors 202, 203 and 204, the serial connection of the individual devices on the communication line can be realized.

In the embodiment according to the present disclosure, the connector and the socket unit pair can be realized modularly by setting up the socket unit pair, respectively, thereby making the arrangement of the connector and the socket unit pair more flexible and the design of the connector system easier.

The present disclosure also provides a motor control center. The previously described connectors and connector systems may be used in this motor control center, and the connector systems may in particular be configured as cabinets. The motor control center may include a plurality of control devices. These control devices are each connected to a communication line via a connector in the connector system. In the embodiment according to the present disclosure, these control devices may e.g. be configured in the form of a drawer, and the drawer can be connected to a first interface unit of a corresponding connector in case the drawer is inserted in a recess of the cabinet. In embodiments according to the present disclosure, the control devices may e.g. include motor control devices, transformer devices, lighting devices, power distribution devices and relay devices.

The block diagrams of the circuits, units, devices, apparatuses, equipment, and systems involved in the present disclosure are intended to be exemplary only and do not purport to require or imply that they must be connected, arranged, or configured in the manner illustrated in the block diagrams. As those skilled in the art will recognize, the circuits, units, devices, apparatuses, equipment, and systems may be connected, arranged, and configured in any manner as long as they are capable of achieving the desired purpose. The circuits, units, devices, and appliances involved in the present disclosure may be implemented in any suitable manner, e.g., by using special purpose integrated circuits, field programmable gate arrays (FPGAs), etc., or by using a general purpose processor in combination with a program.

It should be understood by those skilled in the art that the above specific embodiments are only examples and not limitations, and various modifications, combinations, partial combinations and replacements can be made to the embodiments of the present disclosure according to the design needs and other factors, as long as they are within the scope of the appended claims or their equivalents, which are within the scope of the rights to be protected by the present disclosure.

What is claimed is:

1. A connector system for connecting devices and communication lines, wherein the connector system comprises:

a plurality of connectors each comprising:

a first interface unit, wherein the first interface unit comprises a plurality of connection ends, an address storage unit, wherein an address information is stored in the address storage unit, wherein a first group of the connection ends is connected to a first communication line, a second group of the connection ends is connected to the address storage unit, and a third group of the connection ends is connected to a first device, and wherein an address of the first device can be determined by the address information;

a second interface unit connected to the first interface unit and the first communication line; and a third interface unit connected to the first interface unit and the first communication line; and a plurality of socket unit pairs, wherein two socket units in each socket unit pair are connected to each other, wherein the second interface unit and the third interface unit of each connector are configured as plug units, the second interface unit of the connector is connected to one socket unit in one socket unit pair, and the third interface unit of the connector is connected to one socket unit in another socket unit pair.

2. The connector system according to claim 1, wherein the second interface unit and the third interface unit of each connector are each connected to a first group of the connection ends of the first interface unit of each connector via inner connection ends of the second and third interface units, and wherein the second interface unit and the third interface unit are each connected to the first communication line via outer connection ends of the second and third interface units.

3. The connector system according to claim 2, wherein the communication lines are CAN communication lines and the first group of connection ends comprises connection ends for a CAN communication line.

4. The connector system according to claim 2, wherein the address storage unit is configured as an editable address storage unit.

5. The connector system according to claim 2, wherein the first interface unit of each connector is configured as a plug unit.

6. The connector system according to claim 2, wherein the first interface unit, the second interface unit and the third interface unit of each connector are configured as RJ45 terminals.

7. The connector system according to claim 2, wherein the first interface unit of each connector is configured to connect to one of a medical device, an automotive manufacturing device, or an industrial automation device.

8. A motor control center, comprising:

a plurality of connectors each comprising:

a first interface unit, wherein the first interface unit comprises a plurality of connection ends, an address storage unit, wherein an address information is stored in the address storage unit, wherein a first group of the connection ends is connected to a first communication line, a second group of the connection ends is connected to the address storage unit, and a third group of the connection ends is connected to a first device, and wherein an address of the first device can be determined by the address information;

a second interface unit connected to the first interface unit and the first communication line; and a third interface unit connected to the first interface unit and the first communication line;

a plurality of socket unit pairs, wherein two socket units in each socket unit pair are connected to each other, wherein the second interface unit and the third interface unit of each connector are configured as plug units, the second interface unit of the connector is connected to one socket unit in one socket unit pair, and the third interface unit of the connector is connected to one socket unit in another socket unit pair; and a plurality of control devices, wherein each control device of the plurality of control devices is connected to a communication line via a connector of the plurality of connectors.

9. The motor control center according to claim 8, wherein the plurality of control devices comprises motor control equipment, transformer equipment, lighting equipment, power distribution equipment and relay equipment.

10. A connector system for connecting devices and communication lines, wherein the connector system comprises:

a plurality of connectors each comprising:

a first interface unit, a second interface unit, and a third interface unit, wherein the first interface unit comprises a plurality of connection ends, an address storage unit, wherein an address information is stored in the address storage unit, wherein a first group of the connection ends is connected to a first communication line, a second group of the connection ends is connected to the address storage unit, and a third group of the connection ends is connected to a first device, and wherein an address of the first device can be determined by the address information; and a plurality of socket unit pairs, wherein two socket units in each socket unit pair are connected to each other, wherein the second interface unit and the third interface unit of each connector are configured as plug units, the second interface unit of the connector is connected to one socket unit in one socket unit pair, and the third interface unit of the connector is connected to one socket unit in another socket unit pair.

* * * * *